(12) United States Patent
Juhasz

(10) Patent No.: US 7,990,724 B2
(45) Date of Patent: Aug. 2, 2011

(54) MOBILE MOTHERBOARD

(76) Inventor: Paul R. Juhasz, Houston, TX (US)

( * ) Notice: Subject to any disclaimer, the term of this patent is extended or adjusted under 35 U.S.C. 154(b) by 294 days.

(21) Appl. No.: 12/002,090

(22) Filed: Dec. 14, 2007

(65) Prior Publication Data
US 2008/0130214 A1    Jun. 5, 2008

Related U.S. Application Data

(60) Provisional application No. 60/875,842, filed on Dec. 19, 2006.

(51) Int. Cl.
*H05K 7/00* (2006.01)
(52) U.S. Cl. ............... 361/728; 361/753; 361/800
(58) Field of Classification Search .......... 361/760, 361/720, 748, 790, 724–728, 741, 752–753, 361/756, 759, 784, 785, 789, 796–799, 800–802; 439/59, 61, 296, 345–347, 374
See application file for complete search history.

(56) References Cited

U.S. PATENT DOCUMENTS

| | | | | |
|---|---|---|---|---|
| 4,769,764 | A * | 9/1988 | Levanon | 361/679.09 |
| 5,590,027 | A * | 12/1996 | Provenzale | 361/732 |
| 5,673,174 | A * | 9/1997 | Hamirani | 361/679.32 |
| 5,748,912 | A | 5/1998 | Lee | |
| 6,301,104 | B1 * | 10/2001 | Hu | 361/679.02 |
| 6,381,836 | B1 * | 5/2002 | Lauruhn et al. | 29/831 |
| 6,430,644 | B1 * | 8/2002 | Luen et al. | 710/300 |
| 7,420,815 | B2 * | 9/2008 | Love | 361/752 |

* cited by examiner

*Primary Examiner* — Hung S Bui

(57) ABSTRACT

A motherboard for a computer box having internal circuitry and communication ports comprises a portable motherboard having a connector for connection to an externally accessible connector of said computer box; wherein, connection of said portable motherboard connector to said externally accessible computer box connector enables said computer box to perform computing operations. The inventive motherboard is portably configured to serve one or more computers, preferably a personal computer or laptop. The portable motherboard provides a computer box with a brain. Alternatively, where a computer with a brain is slow, the portable motherboard may be used to boost the brainpower of the slow computer. Whether the portable motherboard brings life to a computer box or boosts the microprocessor power of a computer containing an internal microprocessor, the portable motherboard is a powerful invention that makes microprocessor power more efficient and ubiquitous.

20 Claims, 10 Drawing Sheets

MOBILE MOTHERBOARD

FIELD OF INVENTION

This invention is directed to central processors and motherboards for use in computers.

BACKGROUND

In the early days of computing, computer devices were configured to operate from a fixed location. Even today, a personal computer set up in a home would generally be useable only from the home. As such, these computers are geographically limited.

With the advent of mobile computing, some computer devices have become portable. A lap top computer or a mobile cell phone may travel with the user and generally be useable from any location. These portable computing devices have become devices that generally can be used anywhere, anytime.

Computer devices generally include a motherboard, memory, a keyboard and a display. The motherboard contains the "brains" of the computer device. The motherboard is the physical arrangement that holds the CPU. Motherboards also hold the memory, the basic input/output system (BIOS), expansion slot and interconnecting circuitry.

A conventional computer device is provided with its own motherboard. Each motherboard sits inside a computer box. The location of the motherboard inside the box makes it difficult to reach one or more of the parts of the motherboard if the part is to be replaced or upgraded. In particular, to replace or upgrade a part, a user needs to disassemble the computer box and reach inside the box to reach the part. Also, by locating the motherboard inside the box, the motherboard becomes integrated into the computer box. Accordingly, a motherboard is a dedicated device that is designed to serve one master—namely, the computer device into which the motherboard is integrated. Dedication of a motherboard to a master limits what the motherboard can do to tasks that are defined by the master. If a master is idle, the motherboard gets little use.

The present invention overcomes this and other shortcomings by providing a motherboard that is portably configured to serve more than one computer device.

SUMMARY

I have devised a computer system comprising a portable motherboard which when connected with a computer box having internal circuitry and communication ports, a keyboard terminal and a display forms the computer system. In the preferred embodiment of a personal computer, the motherboard comprises a microprocessor and a connector. The computer box comprises a connector externally accessible from the computer box for receiving and electrically communicating with said motherboard connector, and circuitry interconnecting said computer box connector to the internal circuitry of the computer box for operating the communication ports of the computer box. Connection of the portable motherboard to the computer box enables the computer box to perform computing operations including keyboard terminal and display functions.

In an alternative computer system, the computer box is a laptop computer containing the keyboard terminal and display. The laptop computer comprises a connector externally accessible from the laptop computer for receiving and electrically communicating with said motherboard connector, and circuitry interconnecting said laptop computer connector to the internal circuitry of the laptop computer for operating the laptop computer. Connection of the portable motherboard to the laptop computer enables the laptop computer to perform computing operations including keyboard terminal and display functions.

The portable motherboard I have devised may further comprise a hand held substrate, a microprocessor being attached to said substrate; a connector attached to said substrate; and circuitry interconnecting said microprocessor to said motherboard connector. In other embodiments, the portable motherboard comprises memory attached to said substrate; and/or basic input/output system BIOS attached to said substrate; and/or expansion slots; together with circuitry interconnecting the expansion slots to the motherboard connector.

My inventive method provides a motherboard with a connector; provides a computer box or laptop with an externally accessible connector for receiving the motherboard connector; and connects the motherboard connector to the externally accessible computer box or laptop connector to form a computer system.

PREFERRED EMBODIMENT

Figure 1:
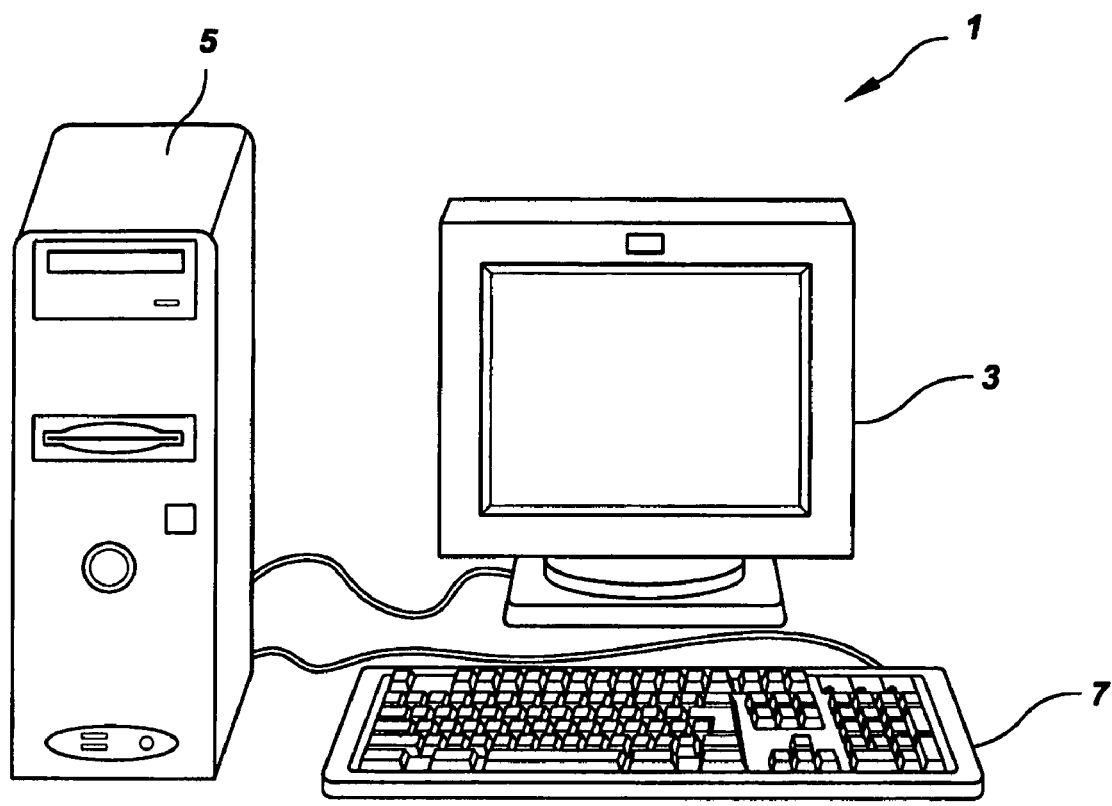
FIG. 1 shows a prior art computer system.

FIG. 1 shows a prior art computer system 1 comprising a computer box 5, a display 3 and a keyboard 7. The computer box contains a motherboard with central processing unit. Computer system 1 may also be a laptop computer wherein the motherboard, display and keyboard are integrated into a single unit. By "computer box" is meant a housing of any form factor that in the prior art contains a motherboard with central processing unit. The computer box may be the form factor for a laptop if the computer box is provided with an integrated display and keyboard.

Figure 2:
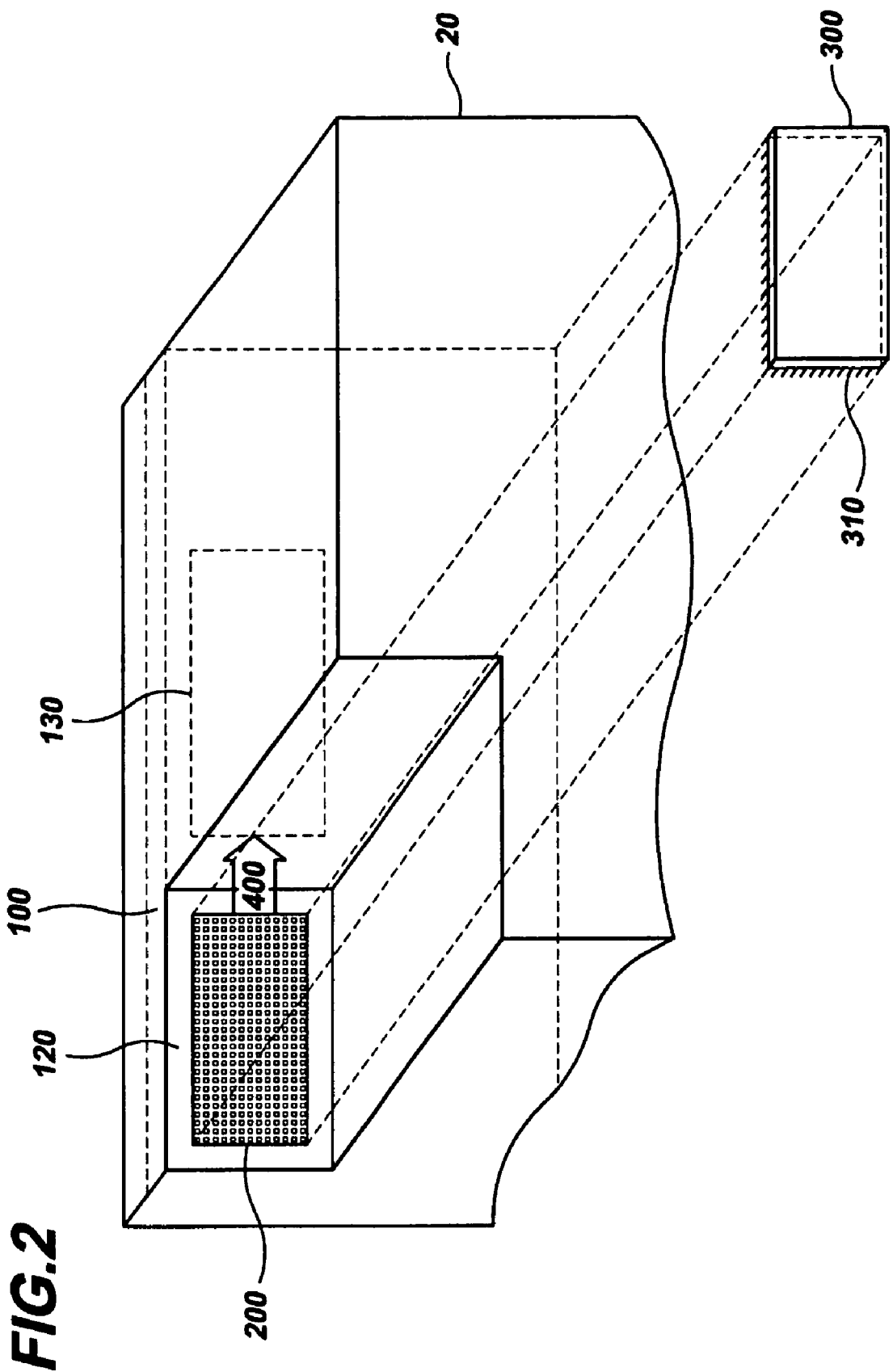
FIG. 2 shows a perspective view of the invention.
Figure 3:
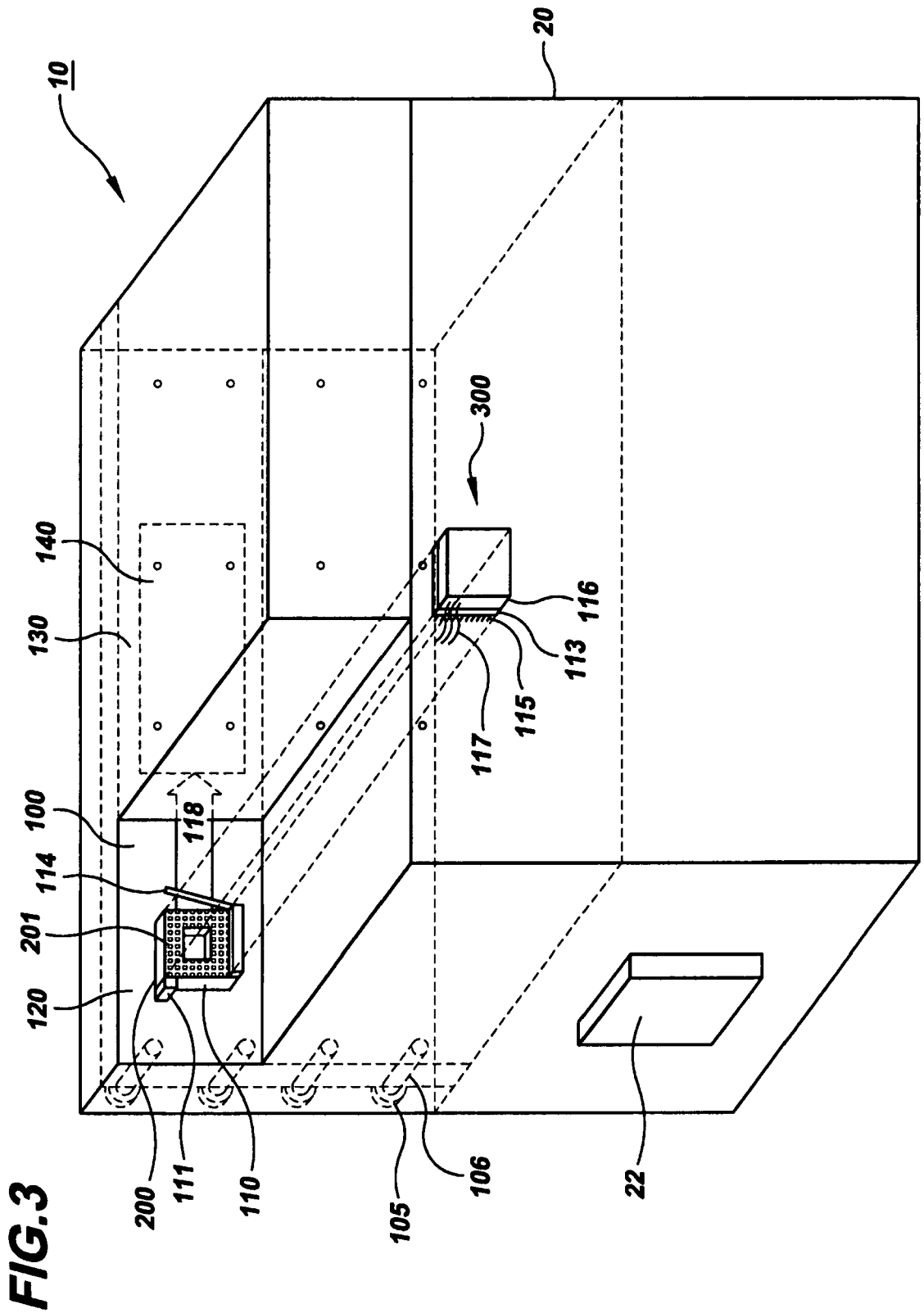
FIG. 3 shows a preferred embodiment of the invention.

FIG. 2 broadly shows a perspective view of the invention. FIG. 2 shows a portion of a computer box 20 of the invention. FIG. 3 shows a perspective of the computer box that is implemented using a first preferred embodiment of the invention.

Referring again to FIG. 2, the computer system of the invention comprises a portable motherboard 300, a motherboard socket 200, a bus 400 and a substrate 100. Motherboard socket 200 is electrically connected to bus 400 and both motherboard socket 200 and bus 400 are connected to substrate 100 which is connected to computer box 20. Specifically, motherboard socket 200 is connected to a first portion 120 of substrate 100 which is accessible from outside of computer box 20. A second portion 130 of substrate 100 lies inside computer box 20.

Figure 6:
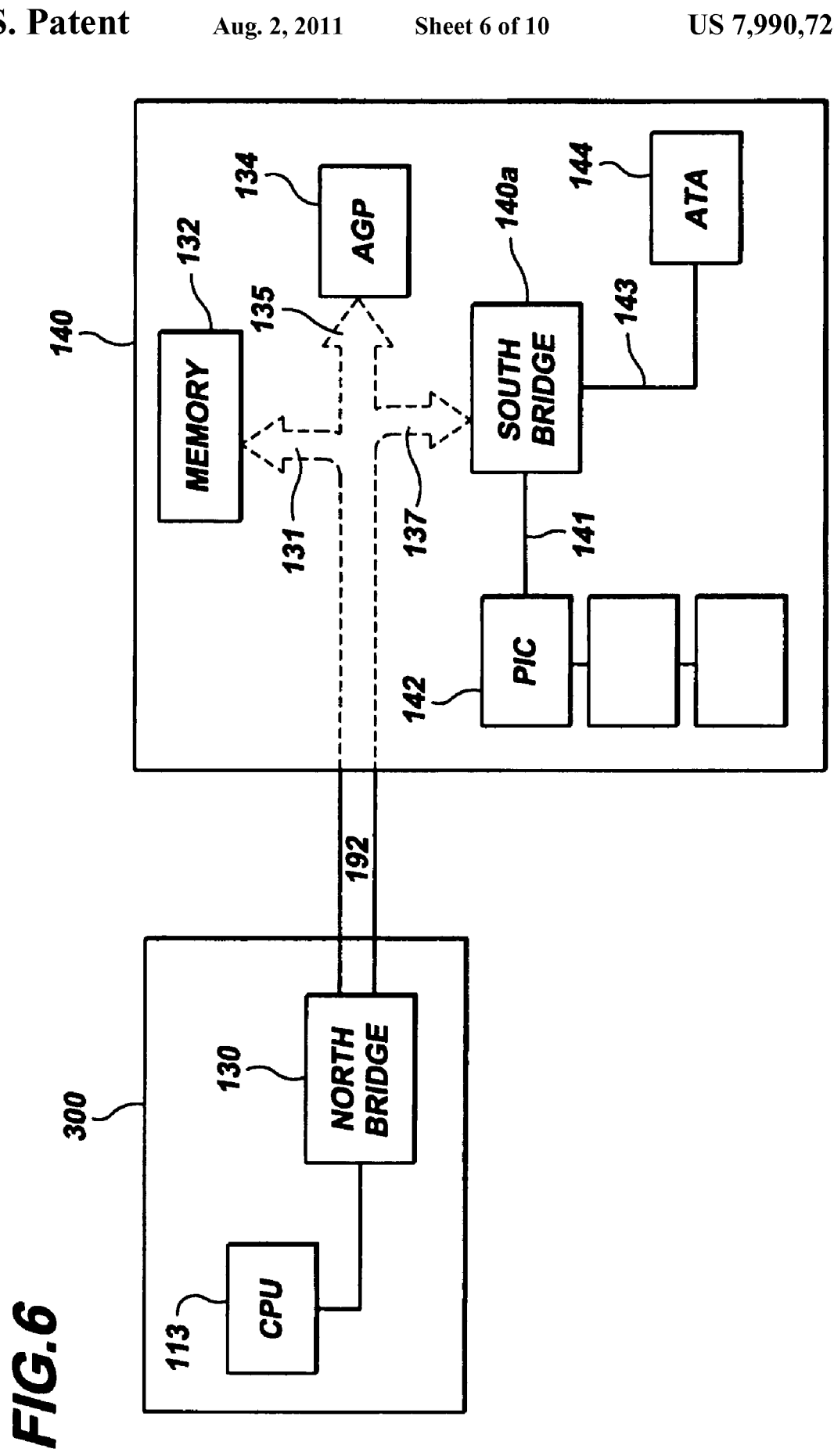
FIG. 6 shows yet another alternative embodiment of the invention.
Figure 7:
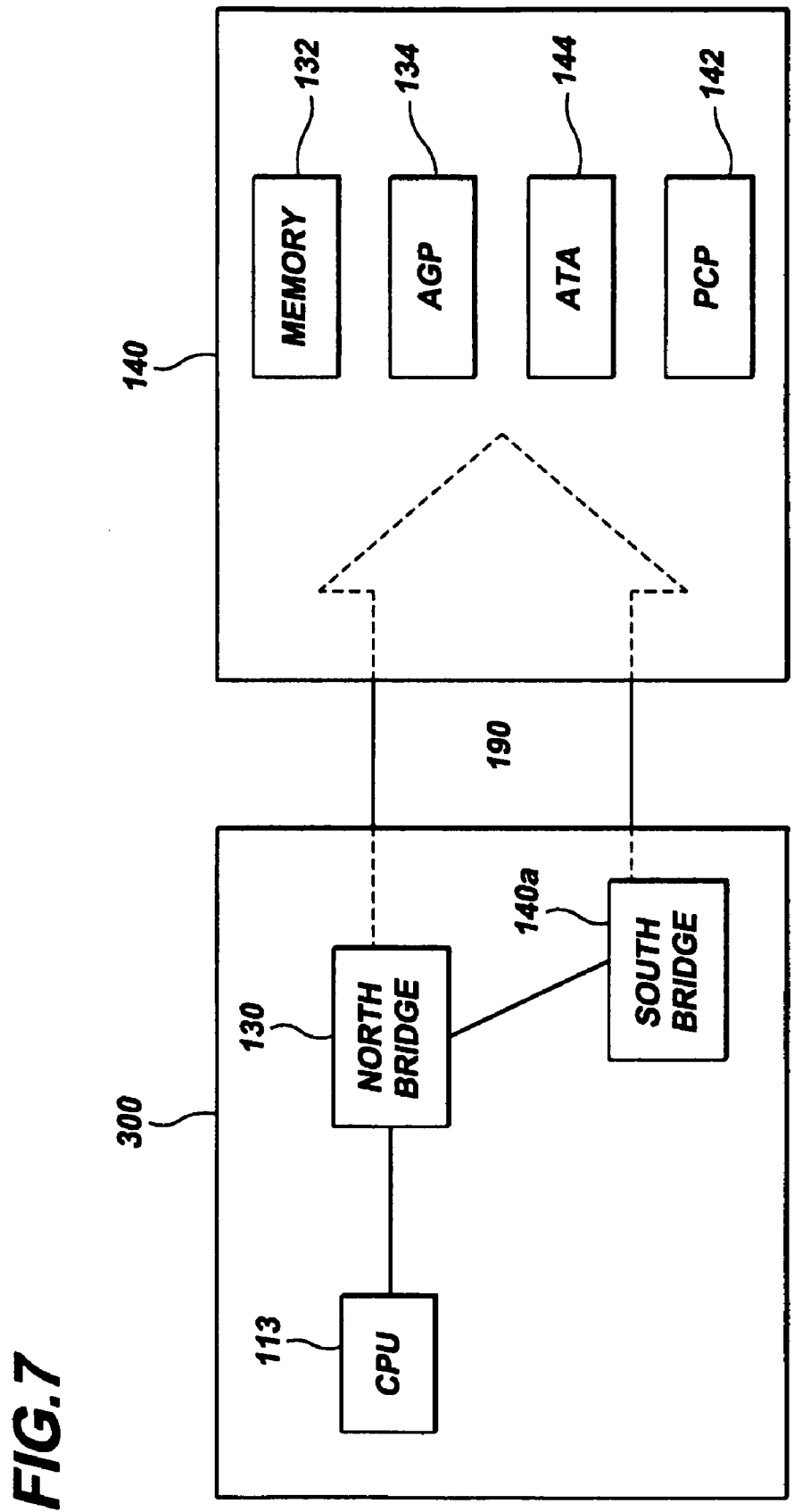
FIG. 7 shows still another alternative embodiment of the invention.

In the preferred embodiment shown in FIG. 3, portable motherboard 300 comprises a central processor 113. Alternatively, as shown in FIG. 6, portable motherboard 300 comprises a central processor 113 and a North Bridge 130. As yet another embodiment, as shown in FIG. 7, portable motherboard 300 comprises a central processor 113, North Bridge 130 and South Bridge 140a. Yet other embodiments of the invention may also be used. For instance, other distributions of the foregoing and or other chips between the portable motherboard and the computer box may be used.

In use, when portable motherboard 300 is connected to motherboard socket 200, central processor 113 may directly or by activation of a switch located on either portable motherboard or computer box 20 be placed into electrical connection with data bus 118 and hence with circuitry internal to computer box 20 to provide processing capability to computer box 20.

FIG. 3 shows a first preferred embodiment of the invention wherein portable motherboard 300 comprises central processor 113 with connection pins 115 and cooling fan 116 with three wire leads 117. Connection pins 115 mate with connector receptacles 201 on motherboard socket 200. Lever 114 found on motherboard socket 200 is used to provide a tight electrical connection between portable motherboard 300 and motherboard socket 200. Three wire leads 117 from cooling fan 116 on portable motherboard 300 provide electrical connection to pins 111 on first portion 120 of substrate 100 for powering fan 116. Substrate 100 is held to computer box 20 by screws 105 and away from the wall of computer box 20 by spacers 106. Also shown on computer box 20 is disk drive 22. Electrical bus 118 provides electrical connectivity between central processor 113 of motherboard 300 and circuitry 140 residing on second portion 130 of substrate 100.

Figure 4:
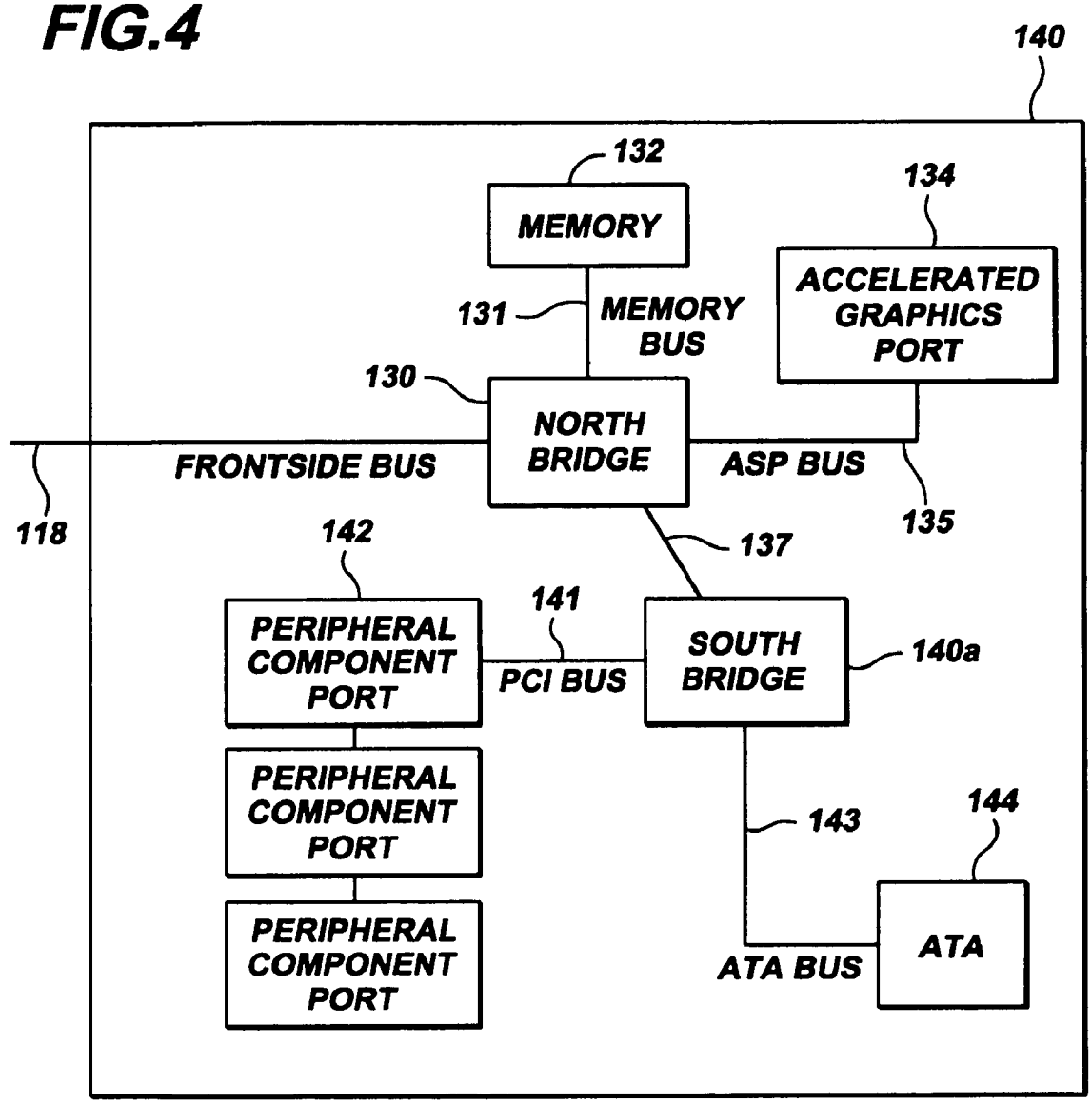
FIG. 4 shows a block diagram of functions of a motherboard internal to the computer.

FIG. 4 shows a functional block diagram of circuitry 140. Circuitry 140 comprises a North Bridge 130 and a South Bridge 140a. North Bridge 130 is electrically connected through memory bus 131 to memory 132, is electrically connected through AGP bus 135 to accelerated graphics port 134, and is electrically connected through bus 137 to South Bridge 140a. South Bridge 140a is electrically connected through PCI bus 141 to peripheral component port(s) 142 and is electrically connected through ATA bus 143 to ATA 144. Each of these components are well known in the art.

Figure 5:
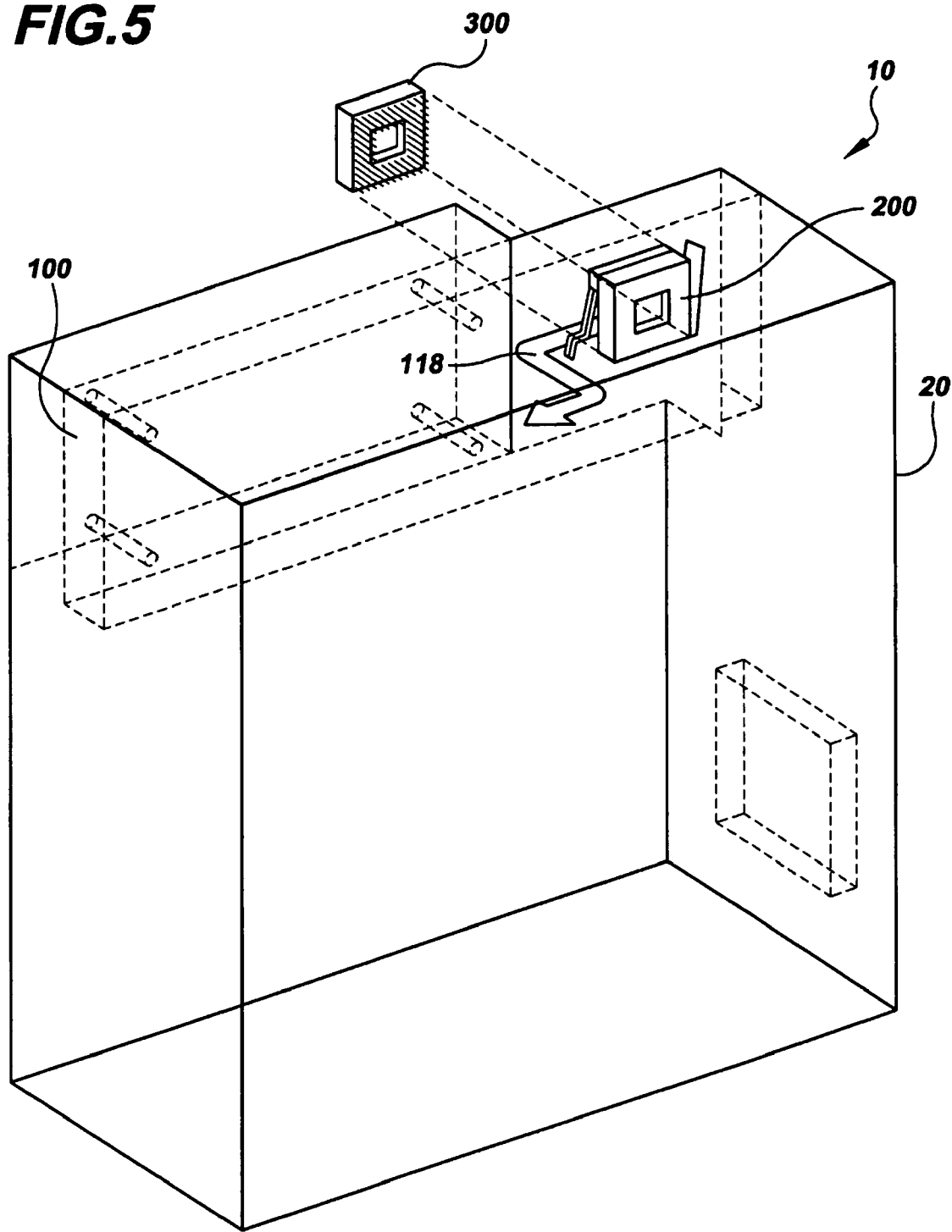
FIG. 5 is an alternative embodiment of the invention.

FIG. 5 shows an alternative embodiment of the invention wherein substrate 100 is a two sided printed circuit board. Electrical bus 118 in this embodiment carries data from portable motherboard 300 through substrate 100 to circuitry residing on the other side of substrate.

FIG. 6 shows an alternative embodiment of the invention. In this embodiment, portable motherboard 300 comprises central processing unit 113 and North Bridge 130. Data bus 192 provides electrical connection of both central processing unit 113 and North Bridge 130 to circuitry 140 residing inside computer box 20. Circuitry 140 in this example comprises memory 132, AGP 134, South Bridge 140a, ATA 144, and PIC 142 which are electrically connected to data bus 192 through bus 131, bus 135, bus 137, bus 143 and bus 141, respectively.

FIG. 7 shows yet another embodiment. In this embodiment, portable motherboard 300 comprises central processing unit 113, North Bridge 130, and South Bridge 140a. Data bus 190 provides electrical connection of central processing unit 113, North Bridge 130, and South Bridge 140 to circuitry 140 residing inside computer box 20. Circuitry 140 in this example comprises memory 132, AGP 134, ATA 144, and PCP 142.

Figure 8:
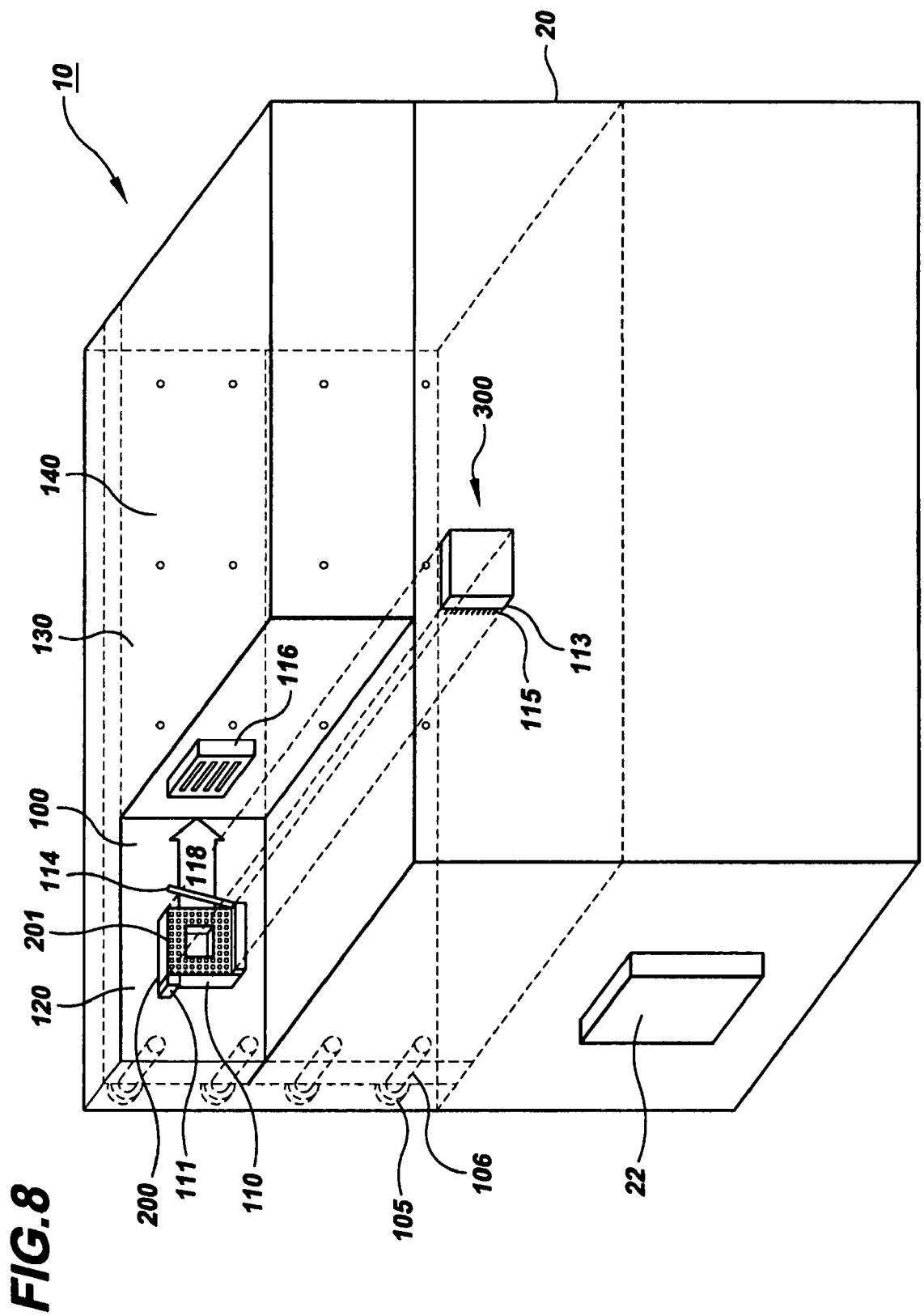
FIG. 8 shows still another alternative embodiment of the invention.
Figure 9:
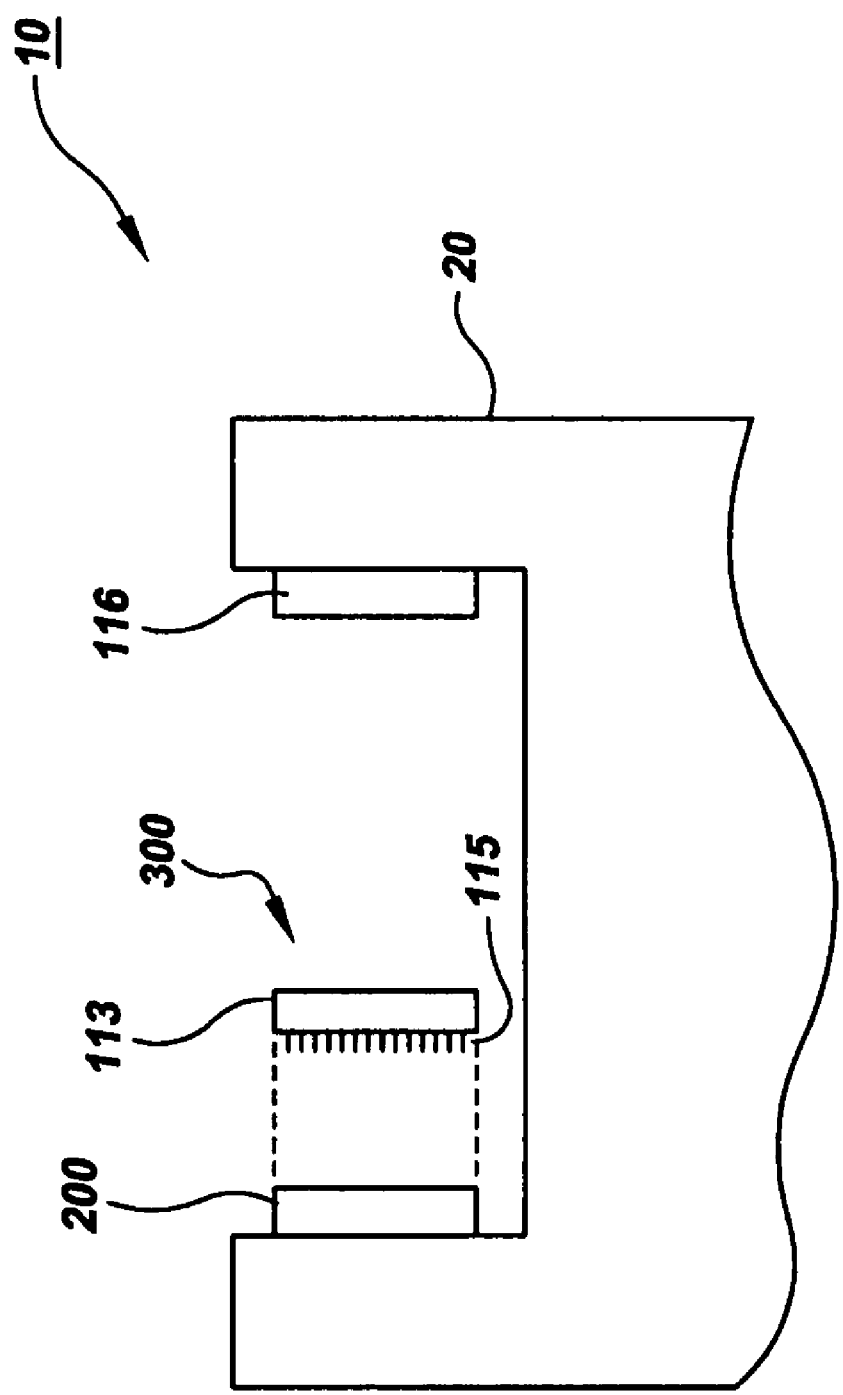
FIG. 9 shows still another alternative embodiment of the invention.

FIG. 8 shows the embodiment of FIG. 3 with fan 116 being integrated to computer box 20 for providing cooling. This embodiment further mobilizes portable motherboard 300 of the FIG. 3 embodiment by stripping the motherboard of any fan and fan connection hardware that may be required to dissipate heat from the motherboard. Preferably, in this embodiment the fan is integrated to the outside of the computer box. Alternatively, the fan may be integrated to the inside of a computer box facing outwardly with the computer box being provided with a grill for allowing forced air generated by the fan to pass outside of the computer box to dissipate heat from the motherboard. In another embodiment shown in FIG. 9, fan 116 is so integrated to computer box 20 as to lie along the same axis as the installed portable motherboard 300. This form fact further enhances the dissipation of heat generated by the portable motherboard.

It will be appreciated that the location of portable motherboard 300 external to the computer box improves the heat dissipation properties of the motherboard by exposing the motherboard to the natural air flow in the environment instead of confining the heat dissipation from the motherboard to the use of forced air inside of a closed computer box. While a number of the previously described embodiments make use of a fan in providing for heat dissipation from the motherboard, in some instances depending upon the heat dissipation requirements of the motherboard, the natural air flow occurring outside of the computer box may provide sufficient cooling of the motherboard. In those instances, the natural air flow may minimize the need for use of a fan for providing forced cooling of the motherboard or may make the use of a fan to provide forced cooling unnecessary altogether.

With the above and other embodiments, the inventive motherboard is portably configured to serve one or more computers. Preferably, the computer is a personal computer or laptop. Alternatively, the computer may be a server. Yet alternatively, the computer may be a mobile phone. Still alternatively, the computer may be any device that requires a microprocessor to function whether or not the device has a keyboard and/or a display.

Figure 10:
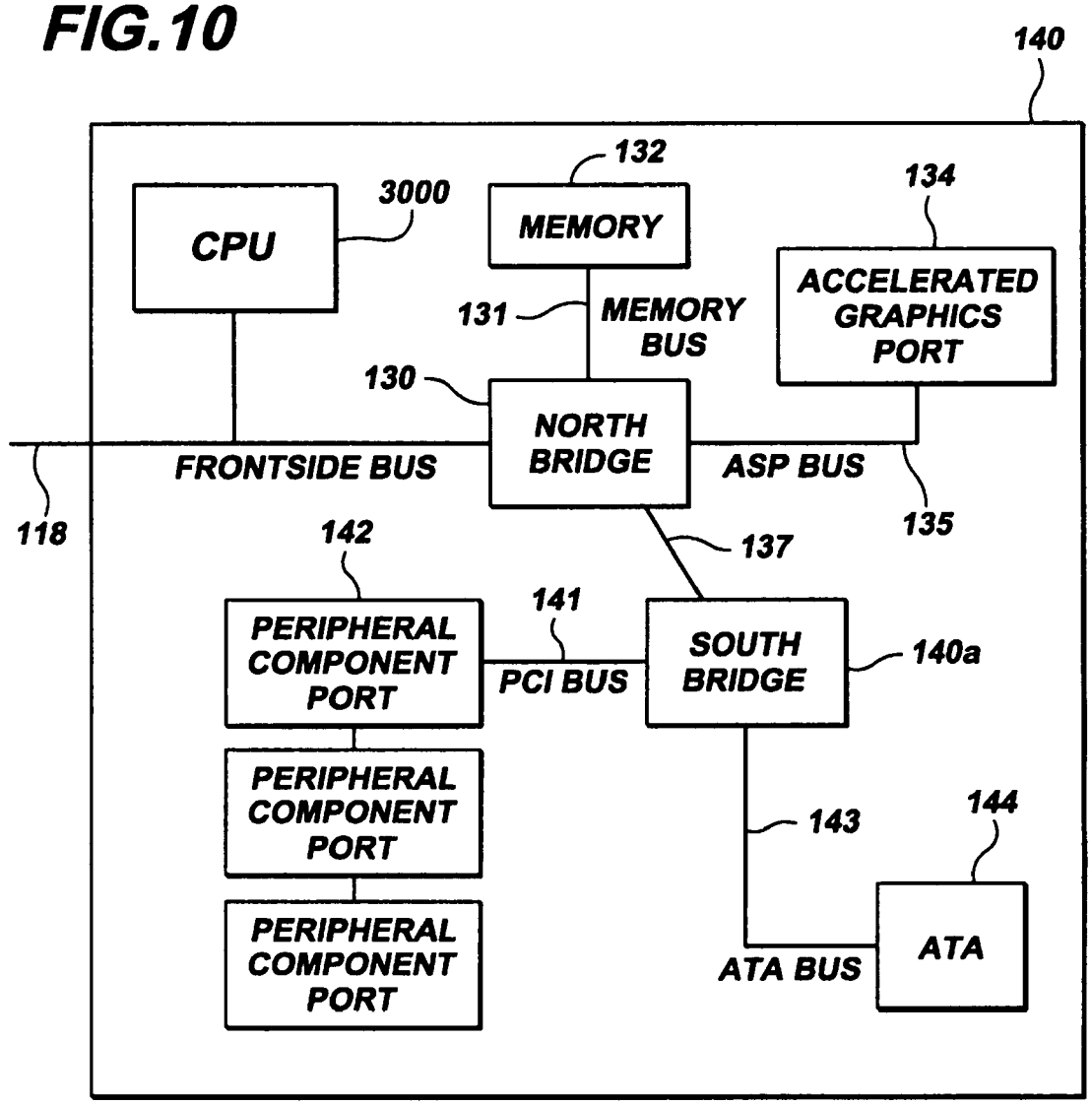
FIG. 10 shows still another alternative embodiment of the invention.

The portable motherboard provides a computer box with a brain. Alternatively, where a computer with a brain is slow, the portable motherboard may be used to boost the brainpower of the slow computer. As shown in FIG. 10, the FIG. 3 portable motherboard may be electrically connected to a computer having internal circuitry 140 having a CPU 3000 in order to boost the microprocessing capability of the computer. Whether the portable motherboard brings life to a computer box or boosts the microprocessor power of a computer containing an internal microprocessor, the portable motherboard is a powerful invention that makes microprocessor power more efficient and ubiquitous.

While the invention has been described in connection with specific embodiments, it is evident that numerous alternatives, modifications, and variations will be apparent to those skilled in the art within the spirit and scope of the invention described above.

I claim:

1. A computer system comprising:
   a computer box, said computer box comprising:
      a housing;
      circuitry enclosed by said housing;
      a bus internal to said housing connected to said circuitry; and
      a first communication port for enabling electrical connection of circuitry external to said housing to said internal bus; and a portable motherboard external to the housing comprising:
  a central processor,
  a bus connected to said processor,
  a connector for engagement with said first communication port for enabling electrical connection of said processor through said processor bus to said internal bus of said computer box;
  one or more second communication ports for enabling electrical connection of circuitry external to said motherboard to said motherboard bus;
  wherein connection of said portable motherboard connector to said first communication port enables said computer box to perform computing operations.

2. The motherboard of claim 1 further comprising a basic input/output system BIOS in electrical communication with said processor.

3. The motherboard of claim 1 wherein said computer box includes a display.

4. The motherboard of claim 1 wherein said computer box includes a keyboard.

5. The motherboard of claim 1 wherein said computer box includes a keyboard and a display.

6. The motherboard of claim 1 wherein said one or more second communication ports enables electrical connection of one or more graphics cards to said motherboard bus.

7. The motherboard of claim 1 wherein said one or more second communication ports enables electrical connection of one or more peripherals to said motherboard bus.

8. The motherboard of claim 1 wherein said computer box is taken from the group consisting of a laptop and a personal computer.

9. The motherboard of claim 1 wherein said computer box is a server.

10. The motherboard of claim 1 wherein said computer box is a mobile phone.

11. A computer system comprising:
  a computer box, said computer box comprising:
    a housing;
    a first central processor enclosed by said housing;
    a bus internal to said housing connected to said first microprocessor; and
    a first communication port for enabling electrical connection of circuitry external to said housing to said internal bus; and
  a portable motherboard external to the housing comprising:
    a second central processor,
    a bus connected to said second microprocessor,
    a connector for engagement with said first communication port for enabling electrical connection of said second processor through said second processor bus to said internal bus of said computer box;
    one or more second communication ports for enabling electrical connection of circuitry external to said motherboard to said motherboard bus;
    wherein connection of said portable motherboard connector to said first communication port enables the second central processor to add to the central processing functions of said first processor.

12. The motherboard of claim 11 further comprising a basic input/output system BIOS in electrical communication with said processor.

13. The motherboard of claim 11 wherein said computer box includes a display.

14. The motherboard of claim 11 wherein said computer box includes a keyboard.

15. The motherboard of claim 11 wherein said computer box includes a keyboard and a display.

16. The motherboard of claim 11 wherein said one or more second communication ports enables electrical connection of one or more graphics cards to said motherboard bus.

17. The motherboard of claim 11 wherein said one or more second communication ports enables electrical connection of one or more peripherals to said motherboard bus.

18. The motherboard of claim 11 wherein said computer box is taken from the group consisting of a laptop and a personal computer.

19. The motherboard of claim 11 wherein said computer box is a server.

20. The motherboard of claim 11 wherein said computer box is a mobile phone.

* * * * *